E. R. MARTINO.
CONTROLLING PEDAL.
APPLICATION FILED JAN. 30, 1917.
1,246,634.
Patented Nov. 13, 1917.
2 SHEETS—SHEET 1.
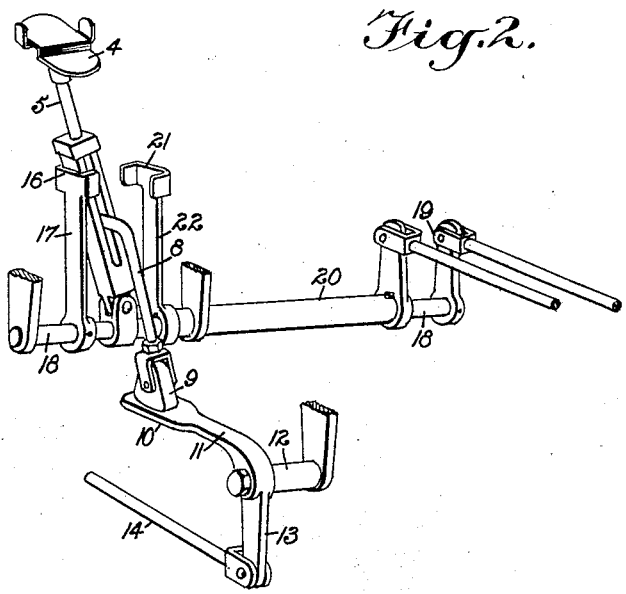
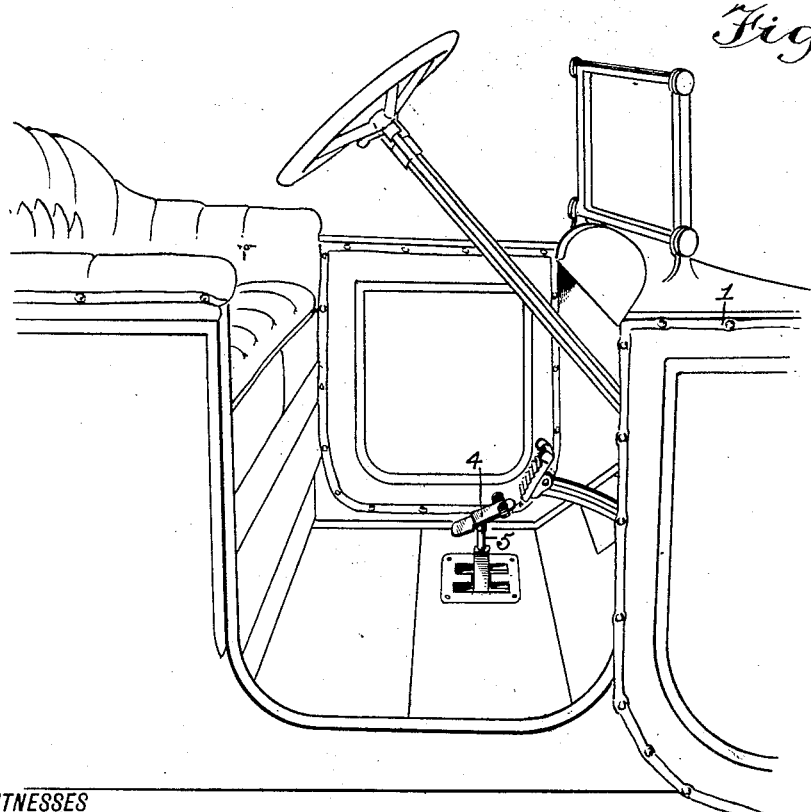
WITNESSES
INVENTOR
Eugene R. Martino
BY
ATTORNEYS E. R. MARTINO.
CONTROLLING PEDAL.
APPLICATION FILED JAN. 30, 1917.
1,246,634.
Patented Nov. 13, 1917.
2 SHEETS—SHEET 2.
Fig. 3.
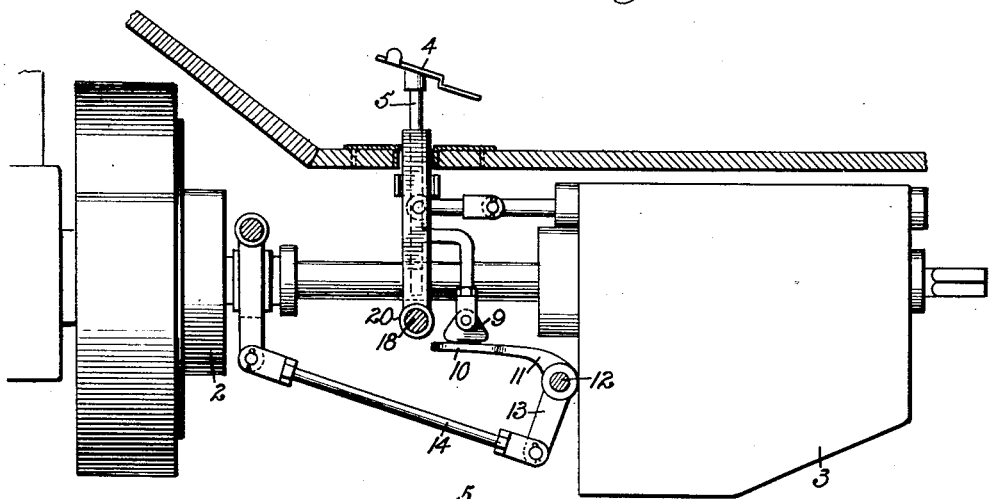
Fig. 5.
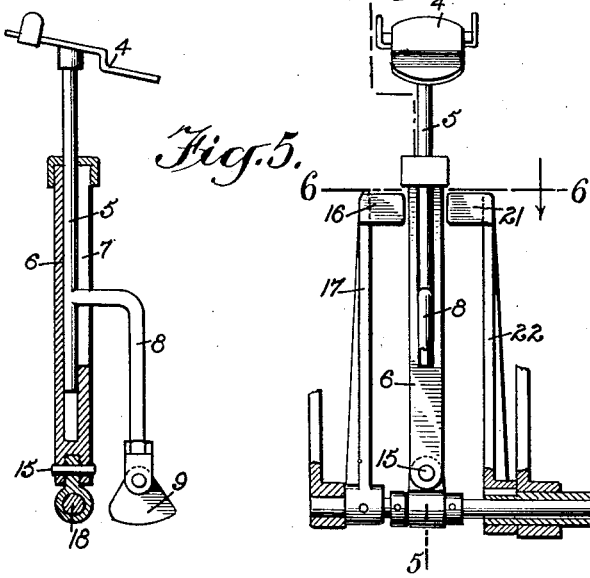
Fig. 4.
Fig. 6.
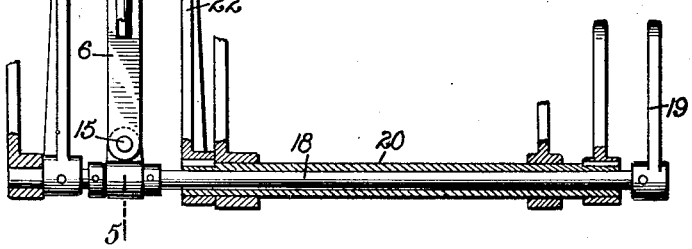
WITNESSES
Geo. W. Naylor
A. L. Kitchin
INVENTOR
Eugene R. Martino
BY
ATTORNEYS

UNITED STATES PATENT OFFICE.

EUGENE R. MARTINO, OF BROOKLYN, NEW YORK.

CONTROLLING-PEDAL.

1,246,634.  Specification of Letters Patent.  Patented Nov. 13, 1917.

Application filed January 30, 1917. Serial No. 145,400.

*To all whom it may concern:*

Be it known that I, EUGENE R. MARTINO, a citizen of the United States, and a resident of the city of New York, borough of Brooklyn, in the county of Kings and State of New York, have invented a new and Improved Controlling-Pedal, of which the following is a full, clear, and exact description.

This invention relates to controlling devices for automobiles and has for an object the provision of an improved construction whereby two controlling members are combined in a single device.

Another object in view is to provide an improved construction whereby the clutch pedal and the gear shifting mechanism are combined in such a way that the clutch will always be out during the shifting of the gears.

A still further object of the invention, more specifically, is to provide a single lever operated by the foot which, by an up and down movement, will throw out the clutch and then by a back and forth movement shift the gears as may be desired, thus insuring the shifting of the gears after the clutch is out.

In the accompanying drawings:

Figure 1 is a fragmentary perspective view of an automobile with a device embodying the invention applied thereto.

Fig. 2 is a detail fragmentary perspective view showing the invention and the various operating parts associated therewith.

Fig. 3 is a fragmentary longitudinal sectional view through part of an automobile showing the clutch and associated controlling members.

Fig. 4 is a fragmentary front view of an embodiment of the invention and certain controlling parts of the automobile associated therewith.

Fig. 5 is a fragmentary sectional view through Fig. 4 on line 5—5.

Fig. 6 is a fragmentary horizontal sectional view through Fig. 4 on line 6—6.

Referring to the accompanying drawings by numerals, 1 indicates an automobile of any desired kind, which is provided with the usual driving mechanism including a clutch 2, as shown in Fig. 3, and a gear shifting mechanism 3. In most of the automobiles now on the market it is necessary to disengage or throw out the clutch before the speed changing mechanism 3 can be operated for changing the speed. The speed changing mechanism 3 is usually a system of gears, some of which are arranged to slide when properly operated by the shifting lever so as to throw the main power shaft into mesh with different sets of gears. In machines where the gears must be shifted for changing the speed the clutch must be previously thrown out or the gears would be stripped or injured in coming together. Usually a clutch pedal is provided and a shifting lever which requires two operations, namely, the operation of throwing out the clutch by pressing the clutch pedal and then by moving the shifting lever to the proper point, after which the clutch is allowed to again move to the in position.

As shown in the drawings, means have been provided for operating the clutch and the shifting of the gears by a single combined lever and pedal mechanism. In forming the structure a pedal 4 is provided which may be of any suitable shape for receiving the foot of the operator, said pedal carrying a rod 5 slidingly fitted into a hollow lever 6. The hollow lever 6 is provided with a slot through which an auxiliary rod 8 extends, as shown in Fig. 5, said auxiliary rod carrying a pivotally mounted shoe 9 continually resting on the enlarged end 10 of the bell crank lever 11. Lever 11 is pivotally mounted at 12 and has the end 13 pivotally connected with the rod 14, which rod is connected with the clutch 2 so as to move the clutch out whenever the shoe 9 is forced downwardly. The clutch 2 is provided with the usual spring (not shown) for forcing the same to the in position when the parts are released. From this it will be seen that upon placing the foot upon the pedal 4 and forcing said pedal downwardly the clutch will be thrown out. After this has been done the pedal and parts associated therewith, including the tubular lever 6, may be swung to one side on the pivotal mounting 15. In fact, the tubular lever 6 may be moved in a plurality of directions in the usual manner of a gear shifting lever, as said lever performs the same function though in a slightly different manner.

If the parts are in their neutral position, as shown in Figs. 3 and 4, and it is desired to start the automobile on the first or low speed, the pedal 4 is pressed downwardly and the tubular lever 6 moved to one side so as to engage the socket 16 on the arm 17, which arm is rigidly secured to shaft 18.

Shaft 18 has a lever 19 rigidly secured thereto, which lever is connected with the proper gears in the speed changing mechanism 3 for throwing the engine into the low or slow speed. In case a reverse movement is desired, all that it is necessary to do is to move the pedal 4 downwardly and then swing all the parts to the rear of the H-plate of the automobile and then release pedal 4. This movement will cause an operation of the shaft 18 so as to throw in the reverse gears. It will be understood that all of the speed changing gears, shaft 18 and the tubular shaft 20 are old and well known.

In case it should be desired to move to second speed or high speed, the pedal 4 is pressed downwardly and the tubular lever 6 moved to a neutral position and from thence over into the socket 21 (Fig. 2), which socket is formed integrally with or rigidly secured to the arm 22, which arm is rigidly secured to the tubular shaft 20. After the lever 6 has engaged the socket 21, said lever may be moved forwardly or rearwardly, as desired, according to the speed desired, and then the pedal 4 released, whereupon the clutch will be automatically thrown in. It will be noted that one foot operates the clutch and also the means for shifting the gears.

In forming a device of this kind the pedal is arranged to be depressed immediately before the same is swung to a new position, whereby the clutch is thrown out automatically prior to the shifting of any gears. It will of course be understood that the idea of providing the pedal 4 and associated parts and the hollow lever 6, with the arms 17 and 22, may be applied to any form of automobile without departing from the spirit of the invention. In addition it will be understood that where a ball and socket journal is used the same principle may be utilized merely by changing the point where the pivotal member 15 is located and reforming the same into the ball and socket journal.

What I claim is:

1. A controlling device for automobiles, comprising a pedal, means for connecting the pedal with the clutch of an automobile whereby when the pedal is depressed said clutch will be moved to an out position, and a guiding member for said pedal connected with the gear shifting mechanism of the automobile whereby when said pedal is swung in different directions different parts of the gear controlling mechanism will be actuated.

2. In a device of the character described, the combination with an automobile, of means for operating the clutch and shifting the speed changing gears, said means comprising a substantially vertically movable pedal for throwing out the clutch and a substantially universally positioned lever guiding the pedal whereby when the pedal is moved in any other direction than a substantially downwardly direction the gear shifting mechanism will be operated.

3. In a device of the character described, the combination with an automobile, of a bell crank lever, means for connecting said lever with the clutch of the automobile, a reciprocating member resting on one end of said bell crank lever, a pedal connected to said reciprocating member whereby whenever said pedal is pressed downwardly said lever will be moved and the clutch will be thrown out, a pivotally mounted member guiding said reciprocating member, and means acted on by said pivotally mounted member for shifting the speed changing gears of said automobile.

4. In a device of the character described, the combination with an automobile, of a bell crank lever, means for connecting one arm of the lever to the clutch of the automobile, the opposite arm of said bell crank lever being widened to an appreciable extent, a reciprocating member acting on said widened part of the bell crank lever, a pedal connected with said reciprocating member, and means controlled by the reciprocating member for controlling the shifting of the speed changing gears of the automobile.

5. In a device of the character described, the combination with an automobile, of a bell crank lever, means for connecting one arm of said lever with the clutch of said automobile, a reciprocating member, a pivotally mounted shoe arranged on said reciprocating member and resting on the free arm of said bell crank lever, and a pedal connected with said reciprocating member for receiving the foot of an operator whereby whenever said pedal or reciprocating member is pushed downwardly said clutch will be thrown out.

6. In a device of the character described, the combination with an automobile, of a clutch pedal designed to throw out the clutch of the automobile, and a swinging guide for the clutch pedal mechanism connected with the controlling devices of the speed changing gear, whereby when the said pedal is operated in a predetermined way the speed changing gear will be correspondingly adjusted.

7. In a device of the character described, the combination with an automobile provided with the usual shafts connected with the speed changing gears, of a lever pivotally mounted on one of said shafts, a pair of arms associated with said lever, one of said arms being rigidly secured to one of said shafts and the other arm to the other shaft, said arms being formed with means for receiving said pivotally mounted lever whereby when said pivotally mounted lever is engaging either of said arms either of said shafts may be operated for shifting the respective speed changing gears, and a clutch operating mechanism guided by said pivotally mounted lever, said clutch operating mechanism being provided with a pedal for receiving the foot of an operator whereby the operator may throw out the clutch and operate the speed changing gears with one foot.

8. In a device of the character described, the combination with an automobile formed with means for shifting the speed changing gears, said means including a pair of shafts, of an arm rigidly secured to each of said shafts, each of said arms being formed with a socket, a pivotally mounted lever connected with one of said shafts and arranged so that part of the lever will be forced into either of said sockets whereby said lever may shift the position of said arms, and means operated by the foot for actuating said lever and the clutch of said automobile.

EUGENE R. MARTINO.